(12) United States Patent
Park et al.

(10) Patent No.: US 9,405,392 B2
(45) Date of Patent: Aug. 2, 2016

(54) DISPLAY DEVICE HAVING PARTIAL PANELS AND DRIVING METHOD THEREOF

(71) Applicant: LG Display Co., Ltd., Seoul (KR)

(72) Inventors: YongChan Park, Seoul (KR); SangSoo Hwang, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/722,936

(22) Filed: May 27, 2015

(65) Prior Publication Data

US 2015/0253924 A1 Sep. 10, 2015

Related U.S. Application Data

(63) Continuation of application No. 14/475,114, filed on Sep. 2, 2014, now Pat. No. 9,075,472.

(30) Foreign Application Priority Data

Dec. 10, 2013 (KR) ........................ 10-2013-0153149

(51) Int. Cl.
| | |
|---|---|
| *G06F 3/041* | (2006.01) |
| *G09G 3/36* | (2006.01) |
| *G06F 3/044* | (2006.01) |
| *G06F 3/045* | (2006.01) |
| *G06F 3/047* | (2006.01) |
| *G02F 1/1333* | (2006.01) |

(52) U.S. Cl.
CPC .......... *G06F 3/0412* (2013.01); *G02F 1/13338* (2013.01); *G06F 3/044* (2013.01); *G06F 3/045* (2013.01); *G06F 3/047* (2013.01); *G06F 3/0416* (2013.01); *G09G 3/36* (2013.01); *G09G 3/3666* (2013.01); *G09G 3/3674* (2013.01); *G09G 3/3677* (2013.01); *G09G 3/3696* (2013.01); *G06F 2203/04101* (2013.01); *G06F 2203/04104* (2013.01); *G06F 2203/04113* (2013.01); *G09G 2300/0413* (2013.01); *G09G 2310/0221* (2013.01); *G09G 2310/0224* (2013.01); *G09G 2354/00* (2013.01)

(58) Field of Classification Search
CPC ....... G06F 3/041; G06F 3/0412; G06F 3/044; G06F 2310/0216; G06F 2310/0218; G06F 2310/0221
See application file for complete search history.

(56) References Cited

U.S. PATENT DOCUMENTS

| | | |
|---|---|---|
| 2006/0145998 A1 | 7/2006 | Cho et al. |
| 2013/0241814 A1 | 9/2013 | Hirabayashi et al. |
| 2013/0314361 A1 | 11/2013 | Saitoh et al. |
| 2014/0049512 A1 | 2/2014 | Yang et al. |

OTHER PUBLICATIONS

United States Office Action, U.S. Appl. No. 14/475,114, Nov. 7, 2014, seventeen pages.

*Primary Examiner* — David Tung
(74) *Attorney, Agent, or Firm* — Fenwick & West LLP

(57) ABSTRACT

Disclosed are a display device comprising panel portions and a driving method thereof, which are capable of dividing the display panel into two or more panel portions and adding a touch mode between the display modes of each panel portion, thereby improving the frequency of the touch sensing or the touch report rate. The display device comprising panel portions and the driving method thereof can reduce the pulse width of the signals from 4H 8phase to 2H 4phase by using an oxide TFT and maintain or reduce the number of the signal lines applied to the gate driver of the partial display panel, thereby having the advantages in terms of the bezel.

10 Claims, 10 Drawing Sheets

(A)

(B)

DISPLAY DEVICE HAVING PARTIAL PANELS AND DRIVING METHOD THEREOF

CROSS-REFERENCE TO RELATED APPLICATION

This application is a continuation of U.S. patent application Ser. No. 14/475,114, filed on Sep. 2, 2014, which claims priority under 35 U.S.C. §119(a) to Korean Patent Application No. 10-2013-0153149, filed on Dec. 10, 2013, all of which are hereby incorporated by reference for all purposes as if fully set forth herein.

BACKGROUND OF THE INVENTION

1. Field of the Invention

The present disclosure relates to a display device comprising a panel divided into different panel portions and a driving method thereof. More specifically, the present disclosure relates to a display device comprising two or more panel portions equipped with touch functions and a driving method thereof.

2. Description of the Prior Art

As information oriented society has been developed, demands for displays for displaying an image are increasing. Thus, various flat displays such as a liquid crystal display (LCD), plasma display panel (PDP), and organic light emitting display (OLED) have been used recently.

The liquid crystal display (LCD) displays an image by controlling light transmittance of a liquid crystal using an electric field. The liquid crystal display (LCD) includes a liquid crystal panel in which liquid crystal cells are arranged in a matrix form and a driving circuit for driving thereof.

A plurality of gate lines (GLs) and data lines (DLs) are intersected therebetween and a thin film transistor (TFT) is formed for driving the liquid crystal cell (Clc) at every intersection between the gate lines (GLs) and the data lines (DLs) on a pixel array of the liquid crystal panel. A storage capacitor is formed for keeping a voltage of the liquid crystal cell (Clc) on the liquid crystal panel. The liquid crystal cell (Clc) comprises a pixel electrode, a common electrode and a liquid crystal layer. The electric field is applied to the liquid crystal layer of the liquid crystal cells (Clc) by both a data voltage applied to the pixel electrode and a common voltage (Vcom) applied to the pixel. The liquid crystal panel displays the image by controlling the quantity of light to penetrate the liquid crystal cell by the electric field.

The driving circuit comprises a gate driving circuit in order to provide a gate output signal for the gate lines and a data driving circuit in order to sequentially provide a video signal or a data voltage for the data lines. The data driving circuit drives the data lines to provide the data voltage for the liquid cells (Clc). The gate driving circuit sequentially drives the gate lines to select the liquid crystal cells of one horizontal line among all of them for which the data voltage will be provided.

The gate driving circuit comprises a gate shift register consisted of a plurality of stages in order to sequentially generate the gate signals. Each stage of the gate shift register outputs a gate clock signal (Vout) generated based on a low voltage (Vss) level and a gate clock signal (CLK) by alternately performing a charging and discharging. Each of output ends and each of the gate lines are connected with each other line by line. The gate signal of a first level from the stages is sequentially generated once per frame and supplied to the corresponding gate line.

On the other hand, for slimming a mobile terminal such as a smart phone, a tablet PC and the like, there have been developed and used a touch screen-integrated display device inside which an element consisted of the touch screen is built-in to provide a touch input function in the display device.

Such touch screen-integrated display device may be expressed as an in-cell type touch panel. In such touch screen-integrated display device, an electrode for sensing touch is commonly used for the common electrode and the common electrode supplies a common voltage to a pixel during a pixel output time and operates as a touch electrode during a touch sensing time.

Such touch-panel-integrated display device typically performs one touch sensing during one frame (period) which is equal to a screen refresh rate of the display panel or one period of a frame frequency.

In other words, if the frame frequency/rate is 60 Hz, Such touch-panel-integrated display device performs both an on/off driving of the pixel through driving the N of gate signals consisted of the panel and touch driving at the end within 1/60s time interval. Thus, the touch sensing frequency (Touch Report Rate) will become the 60 Hz.

However, if the user's touch operation becomes fast and a response speed of the touch operation is considered, the touch sensing frequency of 60 Hz (namely, touch-sensing of 60 times in one second) may be insufficient. Therefore, the touch sensing frequency needs to be improved.

SUMMARY OF THE INVENTION

The present detailed description has been made to solve the above-mentioned problems in the conventional art, and an aspect of the present disclosure is to supply a display device and a driving method thereof.

In one embodiment, a touch sensing display device includes a display panel having gate lines. The display panel includes a first panel portion having a first subset of the gate lines and a second panel portion having a second subset of the gate lines. Gate drivers drive the gate lines. During a single display frame period the display device operates in the following modes during distinct periods of time: a first display mode during which the gate drivers drive the first subset of the gate lines; a first touch sensing mode during which touch is sensed across both the first panel portion and the second panel portion, the first touch sensing mode being after the first display mode; a second display mode during which the gate drivers drive the second subset of the gate lines, the second display mode being after the first touch sensing mode; and a second touch sensing mode during which touch is sensed across both the first panel portion and the second panel portion, the second touch sensing mode being after the second display mode.

In one embodiment, there are N number of the gate lines. The first subset of the gate lines includes 1st to N/2th of the gate lines and the second subset of the gate lines includes (N/2+1)th to Nth of the gate lines.

In one embodiment, the gate drivers comprise first gate driver circuitry to drive the first subset of the gate lines, the first gate driver circuitry receiving one or more first start pulses and enabling the first gate driver circuitry based on the first start pulses. The gate drivers also include second gate driver circuitry to drive the second subset of the gate lines, the second gate driver circuitry receiving one or more second start pulses and enabling the second gate driver circuitry based on the second start pulses.

In one embodiment, the first gate driver circuitry receives at least one end signal and disables the first gate driver circuitry based on the at least one end signal. The second gate driver circuitry receives the at least one end signal and disables the second gate driver circuitry based on the at least one end signal.

In one embodiment, the gate drivers receive a total of four clock signals and drive the gate lines based on the four clock signals. In one embodiment, each clock signal has a pulse width of two horizontal line periods.

In one embodiment, the gate drivers receive four start pulses and enable driving of the gate lines based on the four start pulses. In one embodiment, the gate drivers receive four end signals and disable driving of the gate lines based on the four end signals. In one embodiment, the gate drivers receive two end signals and disable driving of the gate lines based on the two end signals.

In one embodiment, a method of operation in the touch sensing display device is disclosed. A first subset of the gate lines is driven during a first display mode of a display frame period. Touch is sensed across both the first panel portion and the second panel portion during a first touch sensing mode of the display frame period, the first touch sensing mode being after the first display mode. A second subset of the gate lines is driven during a second display mode of the display frame period, the second display mode being after the first touch sensing mode. Touch is sensed across both the first panel portion and the second panel portion during a second touch sensing mode of the frame period, the second touch sensing mode being after the second display mode.

In one embodiment, a display device comprises a total of N gate lines and two or more panel portions. A first panel portion comprises the 1st to N/2th gate lines driven during a display mode before a touch-sensing mode period. A second panel portion comprises the (N/2+1)th to Nth gate lines driven during a display mode after the touch-sensing mode period. An even gate driver is arranged at one side of the first panel portion and the second panel portion, the even gate driver receiving even signals and generating gate output signals to be supplied to even gate lines. An odd gate driver is arranged at another side of the first panel portion and the second panel portion, the odd gate driver receiving odd signals and generating gate output signals to be supplied to odd gate lines. Two clocks, two start pluses and one or two end signals are applied to each of the odd gate driver and the even gate driver.

In accordance with other aspect of the present embodiment, a driving method of display device comprising two or more panel portions is disclosed. The method comprises: within one frame period, applying four clock signals CLK1 to CLK4, a first start pulse VST1, a second start pulse VST2 and four end signals END1 to END4 as a 2H 4 phase signal to a gate driver of a first panel portion to drive a pixel display of the first panel portion, sensing a first touch signal by using a touch electrode comprised in the display device, applying four clock signals CLK1 to CLK4, a third start pulse VST3, a fourth start pulse VST4 and two end signals (END1/END2 or END3/END4) as a 2H 4 phase signal to a gate driver of a second panel portion to drive a pixel display of the second panel portion and sensing a second touch signal by using the touch electrode comprised in the display device.

In accordance with another aspect of the present embodiment, a driving method of display device comprising two or more panel portions is disclosed. The method comprises: within one frame period, applying four clock signals CLK1 to CLK4, a first start pulse VST1, a second start pulse VST2 and two end signals END1 to END2 as a 2H 4 phase signal to a gate driver of a first panel portion to drive a pixel display of the first panel portion, sensing a first touch signal by using a touch electrode comprised in the display device, applying four clock signals CLK1 to CLK4, a third start pulse VST3, a fourth start pulse VST4 and two end signals END1 and END2 equal to two end signals applied to the first panel portion as 2H 4 phase signal to a gate driver of a second panel portion to drive a pixel display of the second panel portion and sensing a second touch signal by using the touch electrode comprised in the display device.

As described above, the various present embodiments can drive two or more panel portions into which the display panel is divided and include a touch-sensing mode period between driving of the panel portions, thereby increasing the frequency of the touch sensing or the touch report rate.

The various present embodiments can drive two or more panel portions into which the display panel is divided and reduce the number of signal lines to maintain or reduce the size of a bezel.

BRIEF DESCRIPTION OF THE DRAWINGS

FIG. 1 is a functional block diagram of all the display panel and FIG. 2 illustrates a gate driving circuit formed at both sides of the panel.

FIG. 6a is a schematic diagram of the signals applied to the respective panel portion. FIG. 6b illustrates the signals applied to the display panel at both sides of the panel symmetrically and FIG. 6c illustrates the input scheme of the end signal according to the second embodiment.

DETAILED DESCRIPTION OF THE EXEMPLARY EMBODIMENTS

Figure 1:
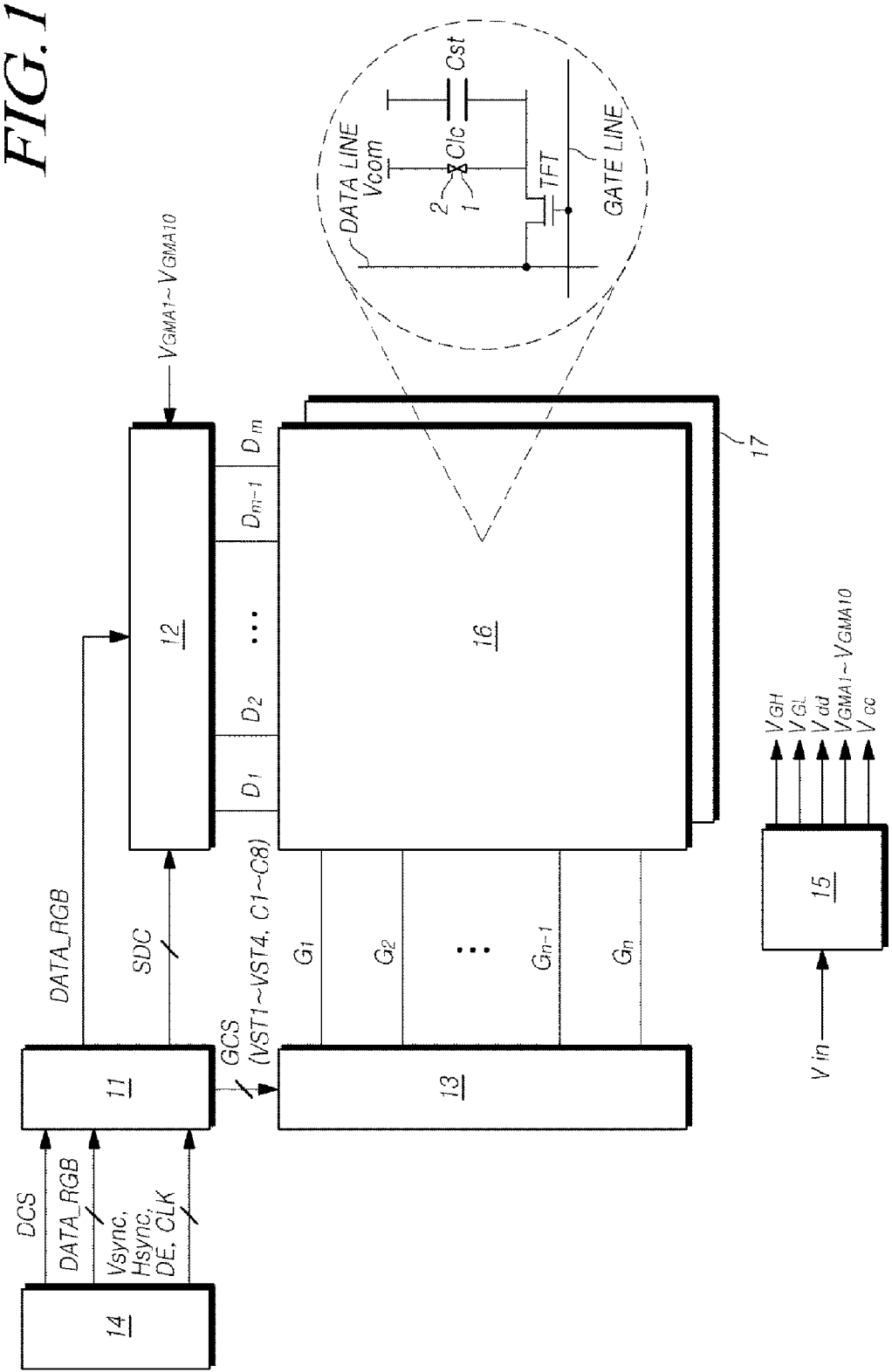
FIGS. 1 and 2 illustrate a liquid crystal display device of the entire driving type (i.e., non-divided panel).

Hereinafter, a few embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order sequence or number of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
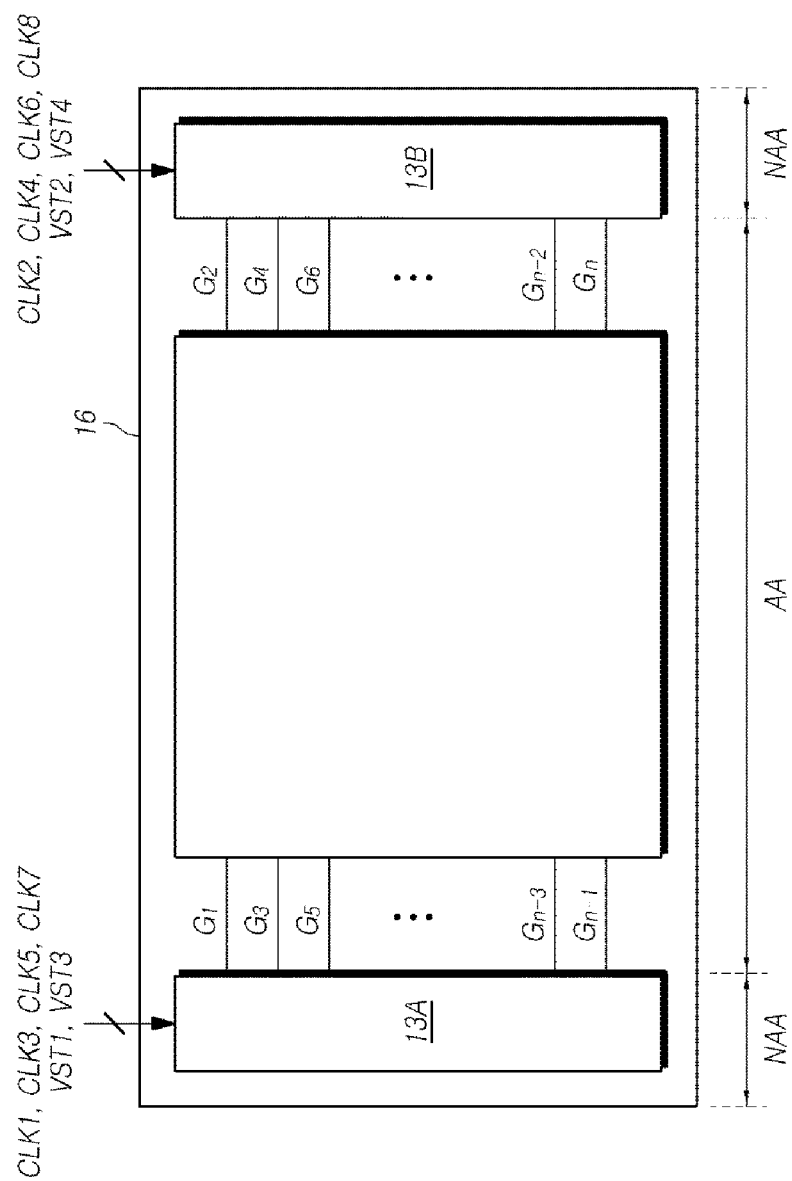

FIGS. 1 and 2 illustrate a liquid crystal display device with an entire driving type (i.e., non-divided panel). FIG. 1 is a functional block diagram of the display panel and FIG. 2 illustrates the a gate driving circuit formed at both sides of the panel.

Referring to FIG. 1, a conventional liquid crystal display device may include a liquid crystal module and an external system 14, etc. The liquid crystal module may include a timing controller 11, a data driving circuit 12, a gate driving circuit 13, a module power unit 15, a display panel 16 and a back light unit 17.

The timing controller 11 rearranges digital video data RGB received from the external system 14 in conformity with a resolution of the liquid crystal display panel 16 and supplies the rearranged digital video data RGB to the data driving circuit 12. The timing controller 11 also generates gate control signals GCS for controlling operation timings of the gate driving circuit 13 and data control signals SDC for controlling the operation timing of the data driving circuit 12. The timing controller 11 generates these control signals using a timing synchronization signal such as a horizontal synchronization signal Hsync, a vertical synchronization signal Vsync, a clock signal DCLK and a data enable signal DE applied from an external system 14.

The timing controller 11 can multiply a frequency of the gate control signals GCS and the data control signals SDC to 60×i Hz so that it can display the image on the pixel array of the liquid crystal display panel with 60×i Hz by the data input with 60 Hz.

The data control signals SDC may include a source start pulse SSP, a source sampling clock SSC, a source output enable signal SOE, a polarity control signal POL, and the like.

The gate control signals GCS may include at least one start pulse, at least two clock signals, and the like. When the thin film transistors TFT of the display device have amorphous silicon channels, the clock signal may include a pulse having an ON pulse width of four horizontal line periods (H), and a total of eight clock signals CLK1 to CLK8 may be used.

Here, a horizontal line period or a horizontal duration period represented by "H" may be defined as the inverse of a value multiplied by the frame frequency/rate and the number of the gate lines. For example, when the display panel has the resolution of 1920×1080, the horizontal duration period becomes 15.4 μs, which is equal to 1/(60 Hz*1080). The horizontal duration period may also be measured as the time between horizontal sync pulses.

As used herein, eight clocks having an ON pulse width of four horizontal line periods (H) is referred to as a 4H 8 phase clock. The clock pulse of each clock has a different phase from the clock pulse of other clocks, resulting in 8 clock pulses with different phases.

The gate driving unit 13 in the display device shown in FIG. 1 may generally use four start pulses VST1~VST4 or two start pulses VST1 and VST2, four end signals END1 to END4 or two end signals END1 and END2.

The gate control signals GCS may further include a gate output enable signal GOE for controlling an output width of the gate signals.

The timing controller 11 may restrict the total number of the clocks C1 to C8 applied to the panel.

The external system 14 may be connected to a broadcast reception circuit or an external video source interface circuit. The external system 14 transmits image data RGB input from the external video source interface circuit to the timing controller 11 through an interface such as a LVDS (Low Voltage Differential Signaling) interface, a TMDS (Transition Minimized Differential Signaling) interface and the like. The external system 14 may transmit timing synchronization signals such as a horizontal synchronization signal Hsync, a vertical synchronization signal Vsync, a clock signal DCLK and a data enable signal DE to the timing controller 11.

The data driving circuit 12 may include a plurality of source driver integrated circuits (ICs). Each of the source driver ICs may sample and latch the digital video data RGB received from the timing controller 11 in response to the data control signal SDC and convert the latched digital video data RGB into deserialized data. Each source driver IC may convert the deserialized data into an analog gamma compensation voltage using positive and negative gamma reference voltages VGMA1 to VGMA10 received from the module power unit 15 and generate positive and negative analog video data voltages to be supplied to the liquid crystal cells Clc. Each source driver IC may invert polarities of the positive and negative analog video data voltages under the control of the timing controller 11 and supply the inverted data voltages to the data lines D1 to Dm.

The gate driving circuit 13 may be implemented as gate in panel (GIP) circuits as shown FIG. 2 through a TFT array process so as to be directly formed on a substrate of the liquid crystal display panel 16.

The gate driving circuit 13 may be formed on a non-display area NAA outside a valid display area AA for displaying the image data RGB in the liquid crystal display panel 16. The gate driving circuit 13 may be symmetrically formed on both sides such as left and right sides or upper and lower sides of the liquid crystal display panel 16.

In other words, the gate driving circuit 13 may comprise a first gate driving circuit 13A sequentially supplying gate signals to odd gate lines G1, G3, . . . , Gn−3 and Gn−1 and a second driving circuit 13B sequentially supplying gate signals to even gate lines G2, G4, . . . , Gn−2 and Gn. Each gate driving circuit may comprise a GIP block corresponding to each gate line.

The first gate driving circuit 13A may operate in response to odd start pulses VST1 and VST3, and odd clocks CLK1, CLK3, CLK5 and CLK7 supplied from the timing controller 11. The odd clocks CLK1, CLK3, CLK5 and CLK7 may be level shifted in a level shifter for appropriately driving the TFT of the liquid crystal cell Clc. The second gate driving circuit 13B may operate in response to even start pulses VST2 and VST4, and even clocks CLK2, CLK4, CLK6 and CLK8 supplied from the timing controller 11. The even clocks CLK2, CLK4, CLK6 and CLK8 may be level shifted in a level shifter for appropriately driving the of the liquid crystal cell Clc.

Although in the aforementioned example above, each gate driver uses two start pulses respectively, each gate driver may use a single start pulse respectively.

In other words, it is described in FIG. 2 that each of the odd start pulses VST1 and VST3 is supplied to each of the first and the third GIP blocks of the odd driving circuit 13A, and each of the fifth and the seventh blocks uses each of outputs of the first and the third GIP blocks as its start signal. It is also possible that the start pulse VST1 is only supplied to the first GIP block and the third and lower GIP blocks use output of the second previous GIP blocks as the start signal.

The end signal END indicating the end of one frame may be supplied to the last two GIP blocks of the gate driving circuits. This end signal may be generated with the data driving circuit 12 and be supplied to the last dummy GIP block. The last dummy GIP block then generates an end signal that is supplied to the previous GIP block.

In detail, each of two dummy GIP blocks (Dummy GIP #1 and Dummy GIP #2) may generate each of the end signals END 1 and END 3 which is supplied to each of the last two GIP blocks (GIP block #n−1 and GIP block #n) respectively. Alternatively, the data driving circuit 12 may also generate one end signal, for example END1, for the gate driving circuit on one side which may be supplied to the last two dummy GIP blocks (Dummy GIP #1 and Dummy GIP #2) at the same time.

Of course, the location of the first and the second gate driver 13A and 13B operated with the even and the odd clocks and the start pulses may be not limited to the configuration of FIG. 2. For example, the first gate driver 13A on one side of the panel may operate in response to the even start pulses VST2 and VST4, and the even clocks CLK2, CLK4, CLK6 and CLK8. The second gate driver 13B on the other side of the panel may operate in response to the odd start pulses VST1 and VST3, and the odd clocks CLK1, CLK3, CLK5 and CLK7. Hereafter, this embodiment will be explained.

Referring back to FIG. 1, a plurality of data lines D1~Dm and gate lines G1~Gn intersect and m×n (m, n is a positive integer) of liquid crystal cells (Clc) are formed in a matrix form on the lower array substrate of the liquid crystal display panel. A k number (k a positive integer) of dummy lines (not shown) may further be formed on the array substrate.

Each of the liquid crystal cells may comprise a thin film transistor (TFT), a pixel electrode 1 electrically connected to the TFT and a storage capacitor Cst. The liquid crystal cell is driven by the voltage difference between the pixel electrode 1 which charges a data voltage through the TFT and a common electrode 2 to which a common voltage Vcom is applied, which displays the image in accordance with the image data RGB by controlling the quantity of light penetrating the liquid crystal cell.

A black matrix, a color filter and the common electrode may be formed on the upper substrate of the liquid crystal display panel. However the common electrode may be formed on the upper substrate in the manner of the vertical electric field such as a twisted nematic (TN) mode or a vertical alignment (VA) mode and on the lower substrate in the manner of the horizontal electric field such as an in plane switching (IPS) mode or a fringe field switching (FFS) mode. The polarizer may be attached to each of the upper and the lower substrates. And the alignment layer may be formed on each of the upper and the lower substrates for setting a pre-tilt angle.

The liquid crystal display panel 16 according to at least one of various embodiments is implemented by not only the TN mode, the VA mode, the IPS mode and the FFS mode but also any other of a liquid crystal mode. Further, the liquid crystal display panel according to at least one of various embodiments is implemented by any other type such a transmissive type, a transflective type, a reflective type and the like.

A touch electrode used in a touch sensing mode may be further formed on the lower substrate of such liquid crystal display panel. In general, the common electrode may also be used as the touch electrode.

In other words, the common electrode may be used for applying the common voltage Vcom to each pixel on the display mode. The common electrode may be also used as the touch electrode for receiving a touch driving pulse during a touch sensing mode.

Figure 3:
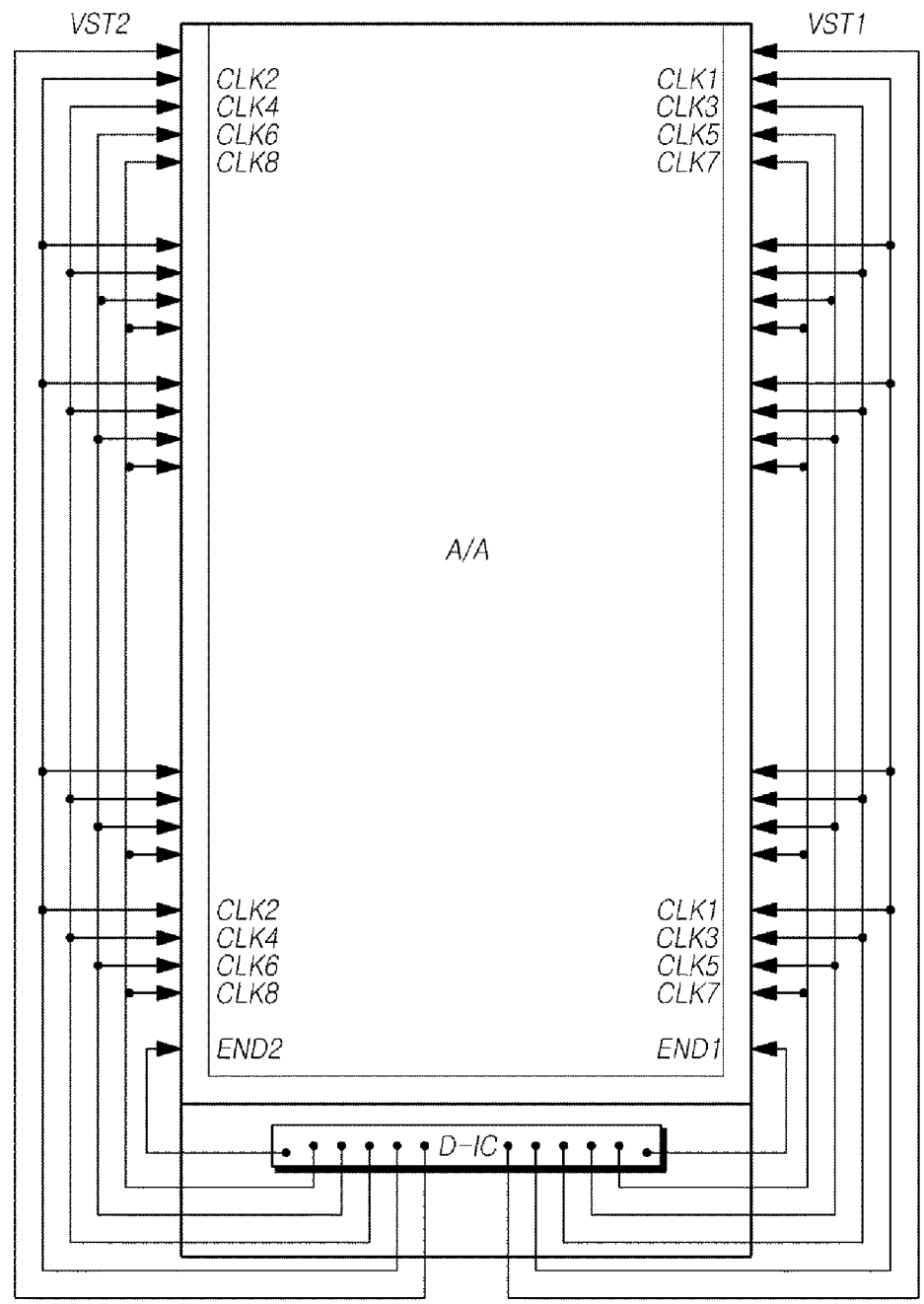
FIG. 3 illustrates the driving method of an entire driving type display device. (a) of FIG. 3 is a timing diagram illustrating a pixel display (light emitting) mode and a touch mode and (b) of FIG. 3 is a block diagram of main configuration mainly illustrating the signal lines.

FIG. 3 illustrates a driving method of an entire driving type display device. (a) of FIG. 3 is a timing diagram illustrating a pixel display (light emitting) mode and a touch mode and (b) of FIG. 3 is a block diagram of main configuration mainly illustrating the signal lines.

The display device shown in FIG. 3 may comprise the total of 1280 gate lines driven by two gate driving circuits (not shown) on both sides of the display device. Four gate clocks CLK and two start pulses VSTs may be applied to each of the gate driving circuits respectively, but it's not limited thereto.

If the frame frequency of the entire driving type display device as shown in FIGS. 1, 2 and 3 is 60 Hz, the frame refresh rate is 1/60=16.7 ms. The earlier time interval among one frame output period, for example 10 ms out of 16.7 ms, may be used as the pixel display mode which displays the image by driving the 1 to 1280 of the gate lines and the data lines at this frame refresh rate. The remaining time interval, for example 6.7 ms out of 16.7 ms, may be used as the touch sensing mode which senses the touch signal by using the common electrode as the touch electrode. Therefore the touch sensing frequency or the touch report rate is 60 Hz.

The entire driving type display device as shown in FIGS. 1 and 2 may generally use TFTs having a semiconductor layer made from amorphous (a-Si) and a 4H 8 phase clock.

Referring to (b) of FIG. 3, four even clocks CLK2, CLK4, CLK6 and CLK8, one even start pulse VST2 and one even end signal END2 are applied to the left gate driving circuit (not shown) of the entire driving type display device. Four odd clocks CLK1, CLK3, CLK5 and CLK7, one odd start pulse VST1 and one even end signal END1 are applied to the right gate driving circuit (not shown) of the entire driving type display device.

Referring to the right gate driver, the start pulse VST1 and the clock CLK1 may be input to an initial odd GIP block #1. The clock CLK3 and the output of GIP block #1 are input to the next odd GIP block #3. The output of GIP block #1 serves as the start signal for odd GIP block #3. The clocks 1, 3, 5 and 7 may be input to the following GIP blocks at the same way. The end signal END1 may be input to the last odd GIP block #1279 and the first dummy GIP block (Dummy GIP #1).

As mentioned above, the signals applied to the left and the right sides may be switched with each other. That is, the even signals and odd signals may be input to the right gate driver and left gate driver, respectively. It is not limited to use only start pulse and one end signal for each gate driver, but two start pulses and two end signals may be also applied to each of the gate driving circuits. That is, each of the start pulses may be input to the first two GIP blocks #1, #3 or #2, #4 and each of the end signals is input to the last two GIP blocks #1278, #1280 or #1277, #1279.

The start pulse VST1 on one side is applied for the initial 4H (1~4H), the start pulse VST2 is applied for 4H (2~5H) separated by 1H and then eight clocks CLK1 to CLK8 are sequentially applied with the pulse width of 4H so that the input state of a 4H 8 phase clock is maintained.

The aforementioned display device can achieve a touch sensing rate of one time per one frame. Therefore the touch sensing frequency or the touch report rate of 60 Hz, which is a relatively slow tough sensing frequency or touch report rate.

To solve such problem, embodiments of the present disclosure divide a display panel into two or more panel portions. The panel portions are driven in a pixel display mode and driven in a touch sensing mode between the pixel display modes of the panel portions, which improves the touch sensing frequency.

For example, the display panel with 1280 gate lines is divided into a first panel portion with 1 to 640 of the gate lines and a second panel portion with 641 to 1280 of the gate lines. A pixel display mode of the first panel portion, a first touch sensing mode, a pixel display mode of the second panel portion, and a second touch sensing mode may be sequentially operated during a single frame period, thereby improving the touch sensing frequency by two times or more.

Various signals mentioned above, namely the clocks, the start pulses, the end signals and the like applied to the gate driving circuits may also be assigned per the panel portions for partial driving of such display panel.

The display device according to one embodiment comprises a total of N gate lines and two or more panel portions. The display device according to one embodiment also comprise a first panel portion comprising the 1st to N/2th of gate lines and a second panel comprising the (N/2+1)th to Nth of gate lines, each of which is driven in a display mode before and after a touch-sensing mode period. The display device also includes even gate drivers arranged at one side of the first panel portion and the second panel portion, and odd gate drivers arranged at another side of the first panel portion and the second panel portion. The gate drivers generate the gate output signals to be supplied to each of the gate lines. Two clocks, two start pluses and one or two end signals are applied to each of the gate drivers. The clock may be a 2H 4 phase signal having a pulse width of two horizontal periods (H) and four phases.

The other embodiment according to the driving method of the display device comprising two or more panel portions may comprise, within one frame period, applying four clock signals CLK1 to CLK4 as 2H 4 phase signals, a first start pulse VST1, a second start pulse VST2 and four end signals END1 to END4 to a gate driver of a first panel portion to drive a pixel display of the first panel portion. A first touch signal is sensed by using a touch electrode in the display device. Four clock signals CLK1 to CLK4, a third start pulse VST3, a fourth start pulse VST4 and four end signals END1 to END4 as 2H 4 phase signal to a gate driver of a second panel portion to drive a pixel display of the second panel portion. A second touch signal is then sensed by using the touch electrode in the display device.

Figure 4:
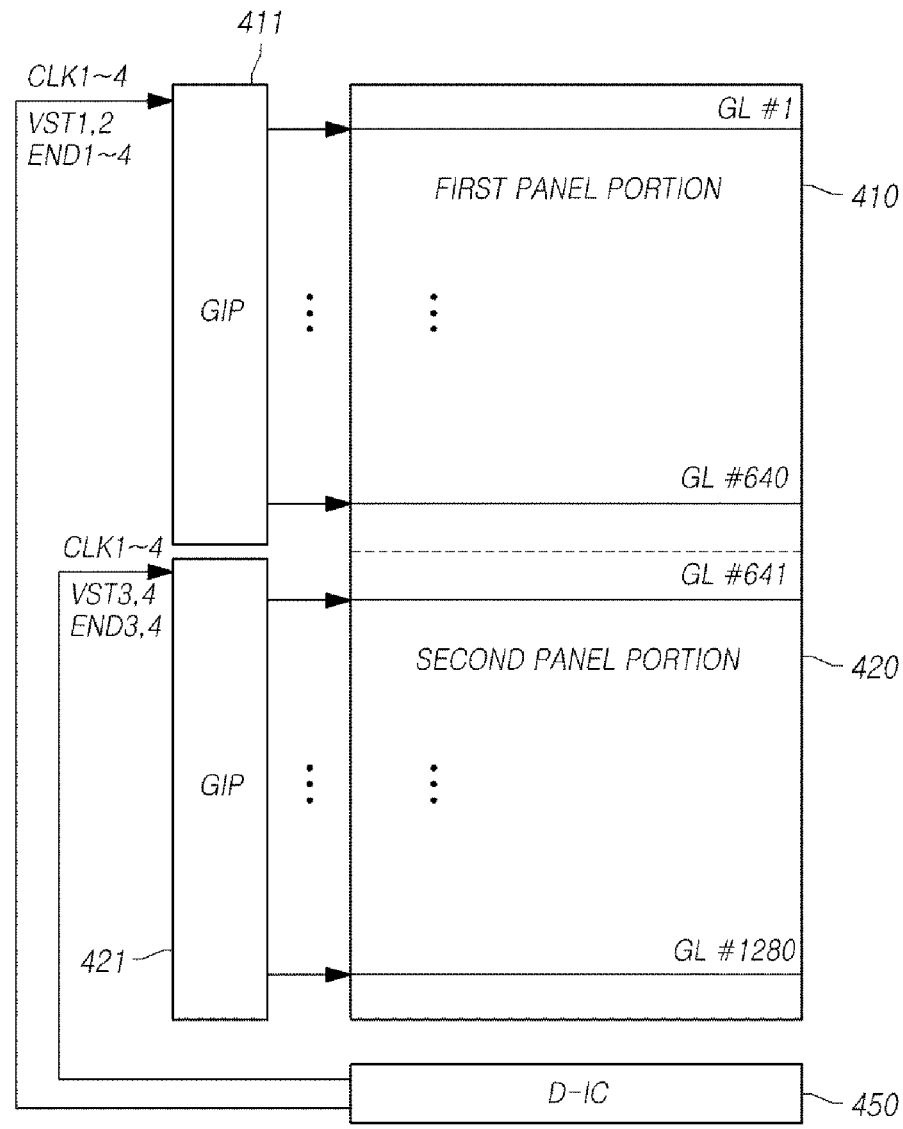
FIG. 4 illustrates a panel portion and a driving method according to the first embodiment. Part (a) of FIG. 4 illustrates the display panel divided into two panel portions and the signals applied to each of them and part (b) of FIG. 4 illustrates the pixel display and the touch driving method using the panel portion.
Figure 4:
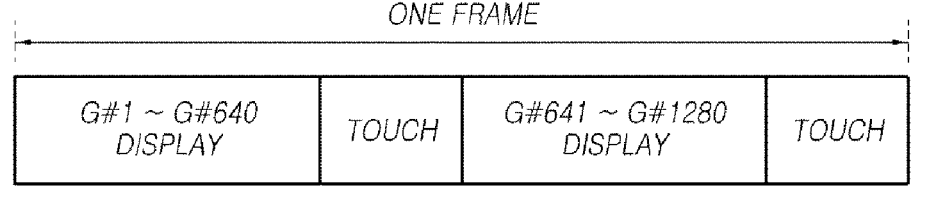

FIG. 4 illustrates panel portions and a driving method according to the first embodiment. Part (a) illustrates the display panel divided into two panel portions and the signals applied to each of them and part (b) illustrates the pixel display and the touch sensing method using the panel portions.

Hereafter, it will be explained that the aforementioned embodiment may have the number of the gate lines equal to 1280, namely N=1280, on the entire display panel, but is not limited thereto.

The display device according to the first embodiment as shown in FIG. 4 may comprise a first panel portion 410 including a first subset of the gate lines (#1 to #640) and a second panel portion 410 including a second subset of the gate lines (#641 to #1280). The data driver (D-IC) 450 may be arranged at a non-display area on one side of the display panel. Although such data driver 450 may be represented with another explanation, it will be understood that it may include all elements which generate signals or pulses for driving both the display and the touch of the panel portions 410 and 420 according to various embodiments. The data driver 450 may also generate signals and pulses to be supplied to the gate driver or the inside of the panel.

The first gate driver 411 and the second gate driver 421 may be arranged on one side of the first panel portion 410 and the second panel portion 420 respectively. Each of the first gate driver 411 and the second gate driver 421 may comprise a plurality of gate circuit blocks for supplying signals to the gate lines respectively. Hereafter, the detailed description will explain such gate circuit blocks as GIP blocks because they are directly formed on the display panel. In other embodiments the gate circuit blocks may not be GIP blocks.

As shown in part (b) of FIG. 4, the display device is controlled such that the first display driving mode for driving the pixels of the first panel portion 410, the first touch sensing mode, the second display driving mode for driving the pixels of the second panel portion 420, and the second touch sensing mode are sequentially driven during distinct periods of time of a single display frame period. During the first display driving mode, the gate lines in the first panel portion 410 are driven by the GIP drivers 411. During the first touch sensing mode, touches are sensed across the entire panel, including both the first panel portion 410 and the second panel portion 420. During the second display driving mode, the gate lines in the second panel portion 420 are driven by the GIP drivers 421. During the second touch driving mode, touches are again sensed across the entire panel, including both the first panel portion 410 and the second panel portion 420.

As previously explained by reference to FIG. 1, a common electrode of the display device serves different purposes during the display driving modes and the touch sensing modes. During the display driving modes a common voltage Vcom may be applied to the common electrode. During the touch sensing modes, the common electrode is used as a touch electrode for receiving touch driving pulses.

Although the touch sensing frequency or the touch report rate is 60 Hz in case of a frame frequency of 60 Hz in the conventional touch type display, the touch sensing frequency or the touch report rate becomes 120 Hz at the same frame frequency in the embodiment of FIG. 4. Thus, the touch sensing rate is higher than the frame rate. For the display mode of the first panel portion 410 in the display device according to the first embodiment as shown in FIG. 4, the signals applied to the first gate driver 411 may be four clock signals CLK1 to CLK4 with a pulse width of two horizontal periods and four phases, a first start pulse VST1, a second start pulse VST2 and four end signals END1 to END4. For the display mode of the second panel portion 420, the signals applied to the second gate driver 421 may be four clock signals CLK1 to CLK4 with a pulse width of two horizontal periods and four phases, a third start pulse VST3, a fourth start pulse VST4 and two end signals END3 to END4.

As mentioned above for the conventional display panel, the right GIPs of the conventional display panel were driven by the Clocks CLK1, 3, 5 and 7, the left GIPs of the conventional display panel were driven by the clocks CLK2, 4, 6 and 8, and each of the clocks had a pulse width of 4H. In other words, it performed the control of the gate using the clock signal with 4H 8 phase, which was the driving scheme generally used for amorphous silicon (a-Si) thin film transistors.

Because a-Si thin film transistors have low charge mobility, for example about 0.5 cm2/VS, it has the disadvantage that as the size of the gate driving circuit block (namely the GIP devices) increases, it also causes the load of the signals applied to one GIP block to be high.

However an oxide semiconductor material used as material of a channel layer of the recent thin film transistor has greater charge mobility than a-Si so that the size of the GIP device can become smaller due to the high device property, and the load on the signals such as the clock can become much smaller.

The conventional structure having a 4H 8 phase clock signal inputs eight clocks to the gate driver so that the bezel area of both the right and the left would be forced to grow. This structure is not suitable for mobile display devices where a narrow bezel is preferred.

In one embodiment, it is preferable that the thin film transistor included in the display device use an oxide semiconductor as the semiconductor layer. Examples of thin film transistors having the oxide semiconductor include the driving TFTs, the switching TFTs arranged at each pixel, and the TFTs within the GIP gate driving circuits.

A material of the oxide semiconductor used for the oxide TFT may comprise a zinc oxide (ZnO) based compound, for example IGZO (Indium Gallium Zinc Oxide), ZTO (Zinc Tin Oxide), ZIO (Zinc Indium Oxide) and the like, but it isn't limited thereto.

When there is used the oxide TFT having high charge mobility is used as mentioned above, it is confirmed that there is no critical deterioration of the performance of the display panel in driving the TFT, even if the pulse of the clock for driving the oxide TFT decreases to 2 horizontal periods (H). It is confirmed there is no problem in driving the gate of the TFT at a driving frequency of 120 Hz according to simulation results. In detail, the waveform of the output signal of the gate driver become fully charged and the falling time become less than 5 μs according to a simulation result of 20 gate lines.

When the pulse width of the clock decreases from 4 H to 2 H, the number of the phase of the gate driving clock may also be decreased from 8 to 4. Therefore, it is possible in the display device according to various embodiments that the '2H 4 phase' pulse may be used as the gate clock.

As the display panel according to various embodiments is divided into the first and the second panel portions to be driven separately, two start pulses and two end signal signals need to be added when compared to the panel as shown in FIG. 3. As a result, the display device according to one embodiment can reduce the number of the clock signals from 8 to 4 but maintain the total number signal lines for each panel portion.

Counting the number of the signal lines applied to the gate driver for driving the panel, the entire driving type panel of FIG. 3 needs to have twelve signal lines (eight clock signals, two start pulses and two end signals). The display device according to the first embodiment of FIG. 4a also needs twelve signal lines (four clock signals, four start pulses and four end signals). Therefore the total number of the signal lines may be maintained despite partially driving the panel.

As to reference voltages, a high potential voltage signal Vdd and a low potential voltage Vss may be commonly used for both panels although not shown in FIG. 4.

Figure 5A:
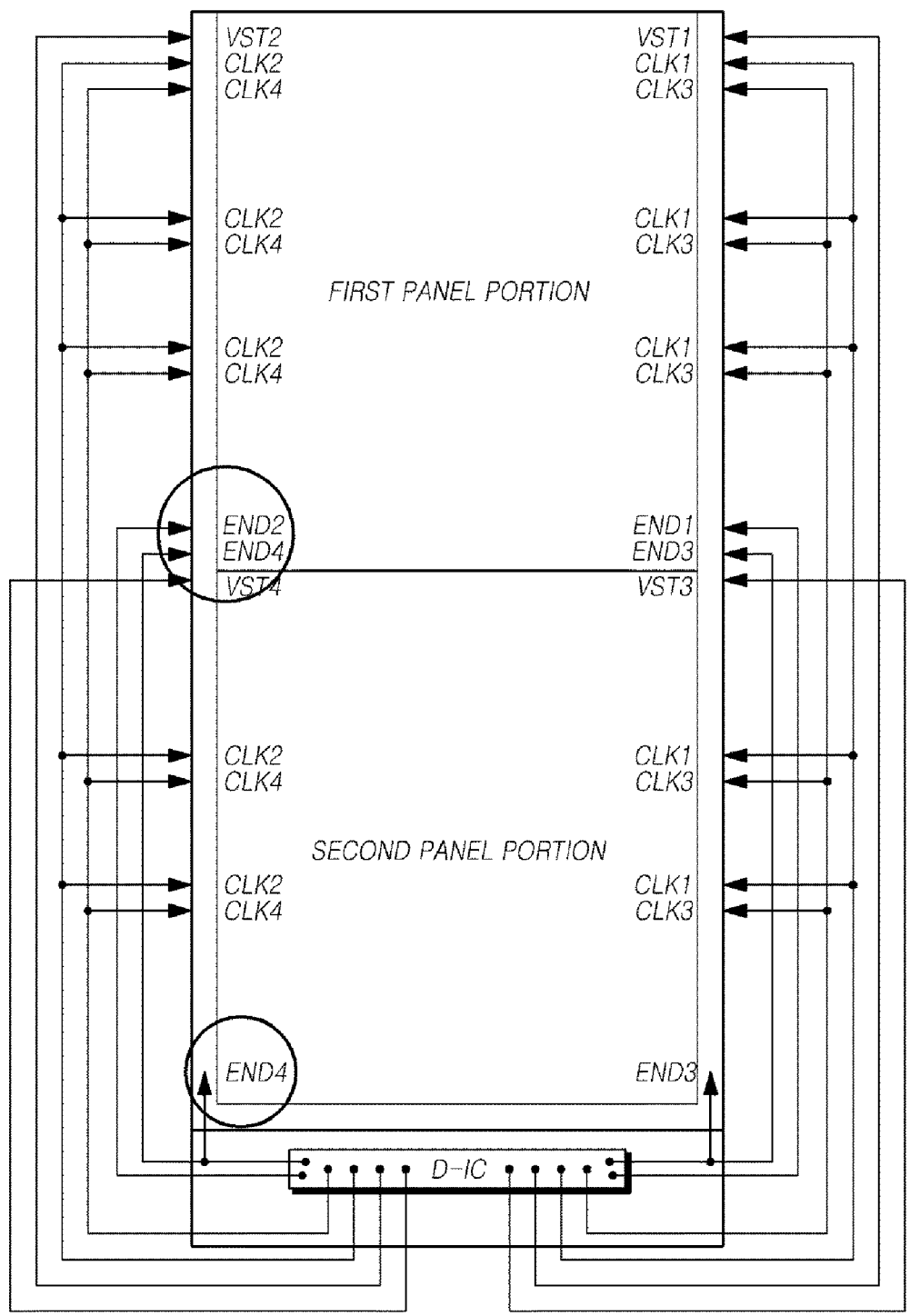
FIG. 5A is a diagram illustrations signals applied to a partial display panel according to the first embodiment.

FIG. 5a is a diagram illustrating signals applied to a partial display panel according to the first embodiment.

FIG. 5a illustrates the data driving circuit (D-IC) arranged at either the upper or the lower side of the panel and signal lines generated from the data driving circuit D-IC applied to both gate drivers on both sides of the panel. The gate drivers and each gate circuit block or GIP block are not shown in FIG. 5a.

Referring to FIG. 5a, the gate drivers (not shown) for the first and the second panel portions may be symmetrically formed on both sides of the panel in the display device. In other words, each of the even signals is input to the even gate driver arranged on the left side of the panel and each of the odd signals is input to the odd gate driver arranged on the right side of the panel respectively as an example. Of course the left and the right arrangements may be reversed with each other.

More specifically, the display device according to the aforementioned embodiment may have a number of the gate lines equal to 1280, namely N=1280. And the display device may comprise the first panel portion 410 including the first to 640th of the gate lines (#1 to #640) and the second panel portion 420 including the 641th to 1280th of the gate lines (#641 to #1280) which are driven in pixel display modes sandwiching the first touch sensing mode interval.

The display panel may comprise an even gate driver and an odd gate driver. The even gate driver receives the even signals and the odd gate driver receives the odd signals. The even and odd gate drivers generate the output signals to be supplied to each of the gate lines. Two clocks, two start pulses and two end signals are applied to each of the even and the odd gate drivers, respectively.

This clock is a 2H 4 phase signal having a pulse width of 2 horizontal periods and four phases. The clocks CLK2 and CLK4, the second start pulse VST2, the second and the fourth end signals END2 and END4 may be input to one side, for example, the left side of the first panel portion. The clocks CLK1 and CLK3, the first start pulse VST1, the first and the third end signals END1 and END3 may be input to one side, for example, the right side of the first panel portion.

The clocks CLK2 and CLK4 along with the fourth start pulse VST4, and the fourth end signal END4 may be input to one side, for example, the left side of the second panel portion. The clocks CLK1 and CLK3 along with the third start pulse VST3, and the first and the third end signals END1 and END3 may be input to one side, for example, the right side of the second panel portion.

In detail, the even and the odd gate drivers comprise even gate circuit blocks (GIP blocks #2, 4 . . . , N) and odd gate circuit blocks (GIP blocks #1, 3 . . . , N−1), respectively. Each of two odd start pulses VST2 and VST4 among the start pluses is applied to an initial gate circuit block (GIP block #2) among the even gate circuit blocks of the first panel portion and an initial gate circuit block (GIP block #642) among the even gate circuit blocks comprised in the second panel portion, respectively.

In accordance with the same scheme, each of two odd starts VST1 and VST3 among the start pulses is applied to an initial gate circuit block (GIP block #1) among the odd gate circuit blocks of the first panel portion and an initial gate circuit block (GIP block #641) among the odd gate circuit blocks of the second panel portion, respectively.

Figure 5B:
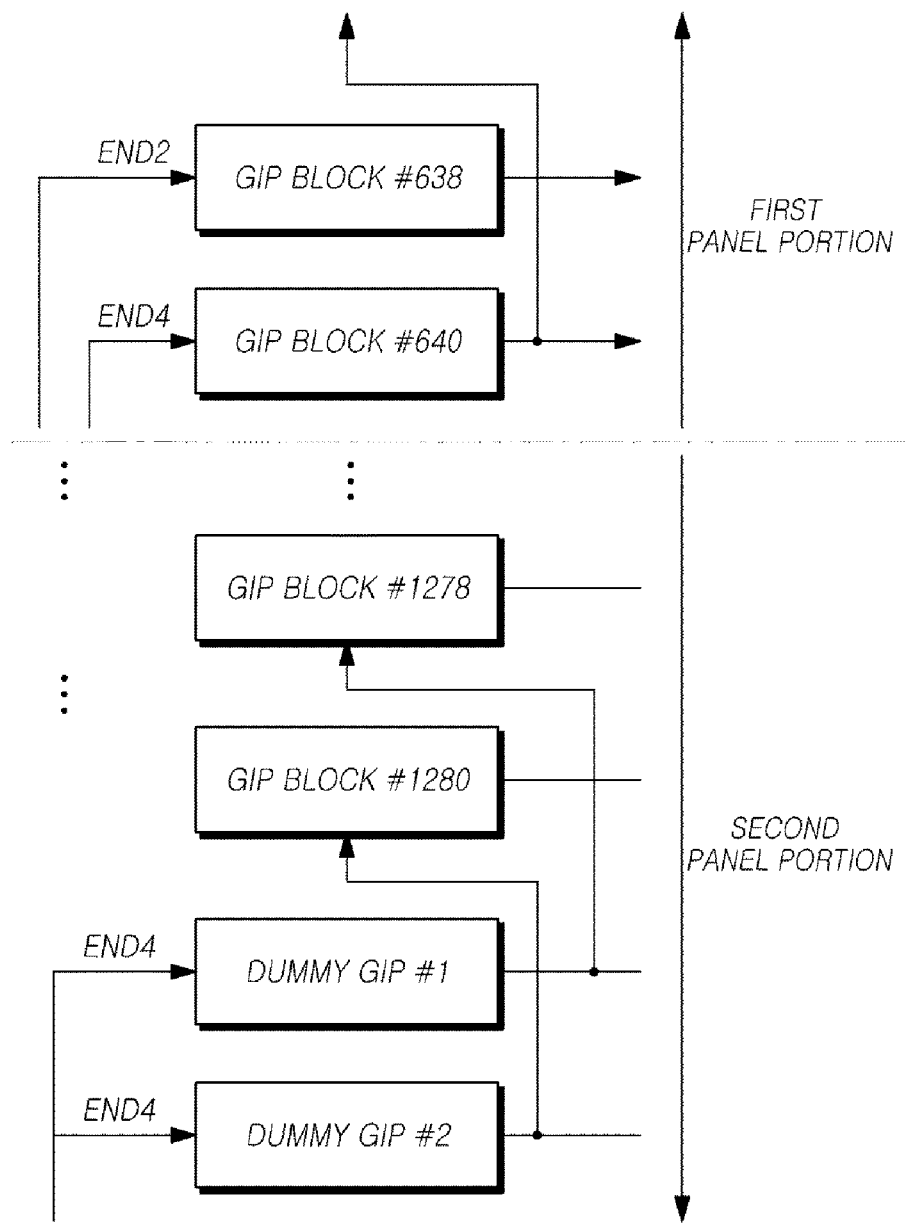
FIG. 5B illustrates a scheme in which the end signal (end) is applied to the first panel portion and the second panel portion in the first embodiment.

FIG. 5b illustrates a scheme in which the end signal (end) is applied to the first panel portion and the second panel portion in the first embodiment.

As mentioned above, each of the even gate drivers and the odd gate drivers may include a plurality of gate circuit blocks, namely the "GIP block" corresponding to the gate line respectively. GIP blocks may be circuit units which receives various signals such as the clock, the high potential voltage signal Vdd, the low potential voltage signal Vss, the start pulse, the end signal and the like from the external data driver, and then generate the output signal for driving the respective gate line and output it to the respective gate line.

Such GIP block may be implemented by a circuit such as a stage of a shift register, but it is not limited thereto. In one embodiment, each GIP block operates as follows. Each GIP block has a start input, a clock input, an output and an end input. The start input receives a pulse that enables the output of the GIP block. When enabled, the GIP block can pass a signal at the clock input to the output. The end input receives a pulse that disables the output of the GIP block.

The GIP blocks are connected in a chain. The output of an odd GIP block is connected to both the start input of the next odd GIP block and the end input of the previous odd GIP block. The output of an even GIP block is connected to both the start input of the next even GIP block and the end input of the previous even GIP block.

Referring to FIG. 5b, there is formed one or more dummy gate lines and the dummy gate circuit block (dummy GIP block #1 and #2) for driving the corresponding dummy gate lines outside the last gate line of the second panel portion. Two even end signals END2 and END4 are applied to the last two gate circuit blocks (GIP blocks #638 and #640) among the even gate circuit blocks in the first panel portion. One of two even end signals END2 and END4, for example END4 in FIG. 5b, is applied to the dummy gate circuit block (Dummy GIP block #1 and #2) for the dummy gate lines. The outputs of the dummy gate circuit blocks (Dummy GIP block #1 and #2) are provided to the end inputs of GIP blocks #1278 and #1280.

Further, the odd end signals END1 and END3 may be applied to the odd gate driver using the same scheme shown in FIG. 5.

Figure 5C:
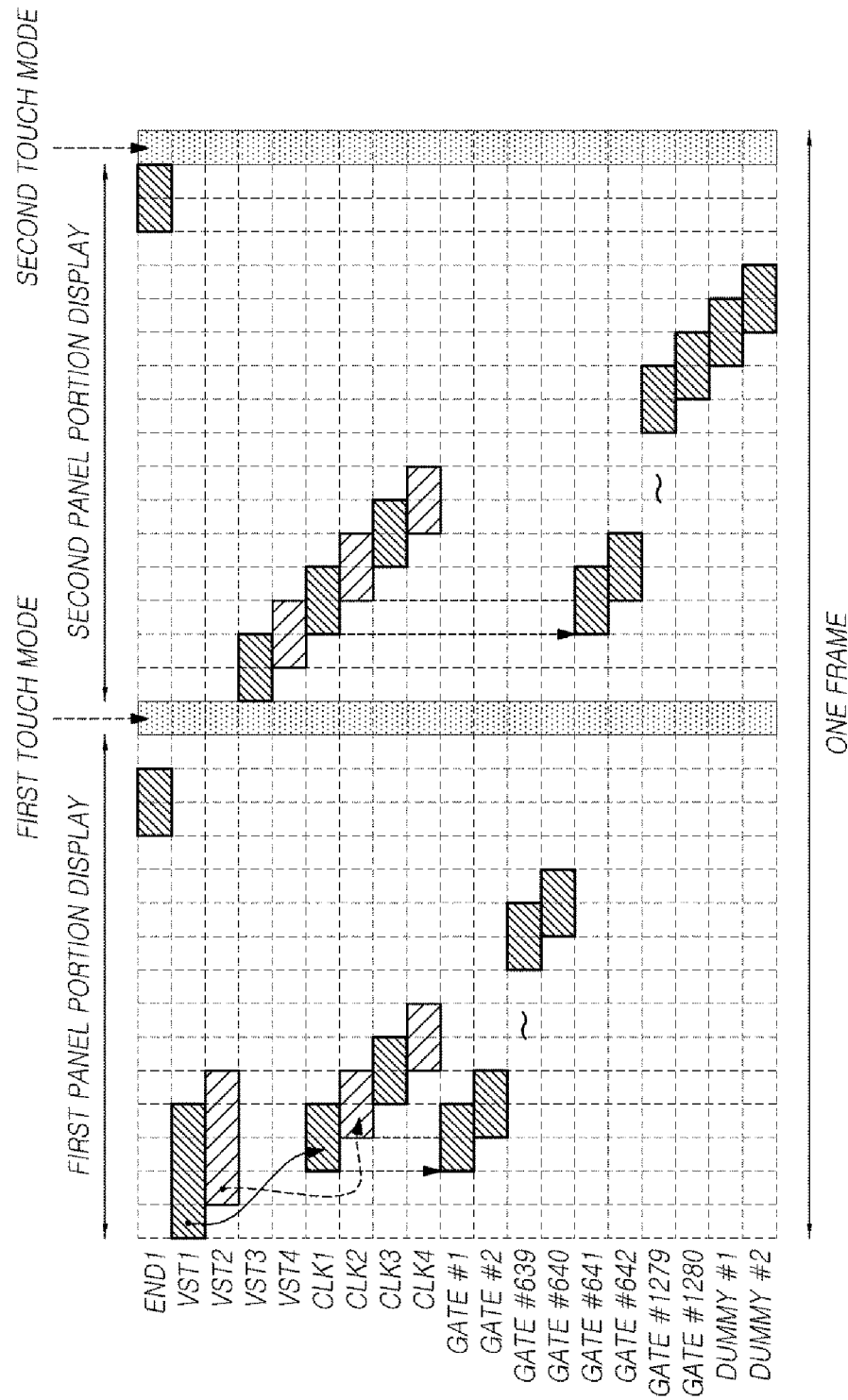
FIG. 5C is a timing diagram when the first embodiment is performed.

FIG. 5c is a timing diagram when the first embodiment is applied.

The total length of the diagram in the horizontal direction represents one frame period. One column of the diagram in the horizontal direction represents one horizontal period.

When the driving method for the panel portion is used, the first and the second start pulses VST1 and VST2 are input to the initial two gate circuit blocks of the first panel portion and one of four clocks is sequentially input to each circuit block. In more detail, the second start pulse VST2 and the second CLK2 and the fourth clocks CLK4 are applied to the even gate circuit block on left side of the panel. The first start pulse VST1 and the first CLK1 and the third clocks CLK3 are applied to the odd gate circuit block on right side of the panel.

The start pulses VST1 and VST2 enable the operation of the GIP driver 411 by triggering the GIP blocks to begin operating as a shift register. The operation to display pixels from gate lines #1 to #640 is sequentially performed so that the first display mode driving for the first panel portion can be completed. The end signals END1, END2, END3, END4 disable or terminate the operation of the GIP driver 411 (only END1 is shown in FIG. 5C) by disabling the last GIP blocks in GIP driver 411.

Next, the touch input is sensed by the operation of the first touch mode for a predetermined time interval.

Next, the second display mode for driving the second panel portion will be explained as follows. More specifically, the third and the fourth start pulses VST3 and VST4 are applied to the two initial gate circuit blocks of the second panel portion and one of four clocks is sequentially input to each circuit block. The start pulses VST3 and VST4 enable the operation of the GIP driver 421 by triggering the GIP blocks to begin operating as a shift register. The operation to display pixels from gate lines #641 to #1280 is sequentially performed. The end signals END3, END4 disable or terminate the operation of the GIP driver 411 (only END1 is shown in FIG. 5C) by disabling the dummy blocks in GIP driver 412.

Next, the touch input is sensed by the operation of the second touch mode for a predetermined time interval during the second touch mode. As a result, the first display mode, a single frame period including the first touch mode, the second display mode and the second touch mode are completed.

The display device according to the first embodiment of FIGS. 4 and 5 needs a total of six signal lines on each side (two clock signals, two start pulses and two end signals), for a total of 12 signal lines. The entire driving type panel of (b) of FIG. 3 also needs to a total of twelve signal lines (eight clock signals, two start pulses and two end signals). Therefore the embodiment of FIGS. 4 and 5 does not increase the total number of the signal lines.

In order words, the display device according to the first embodiment may drive the display before and after the touch mode on both sides of the device to increase the touch sensing frequency and maintain the total number of signal lines input to the gate drivers, which is capable of preventing an increase of the bezel area of the display device.

Figure 6A:
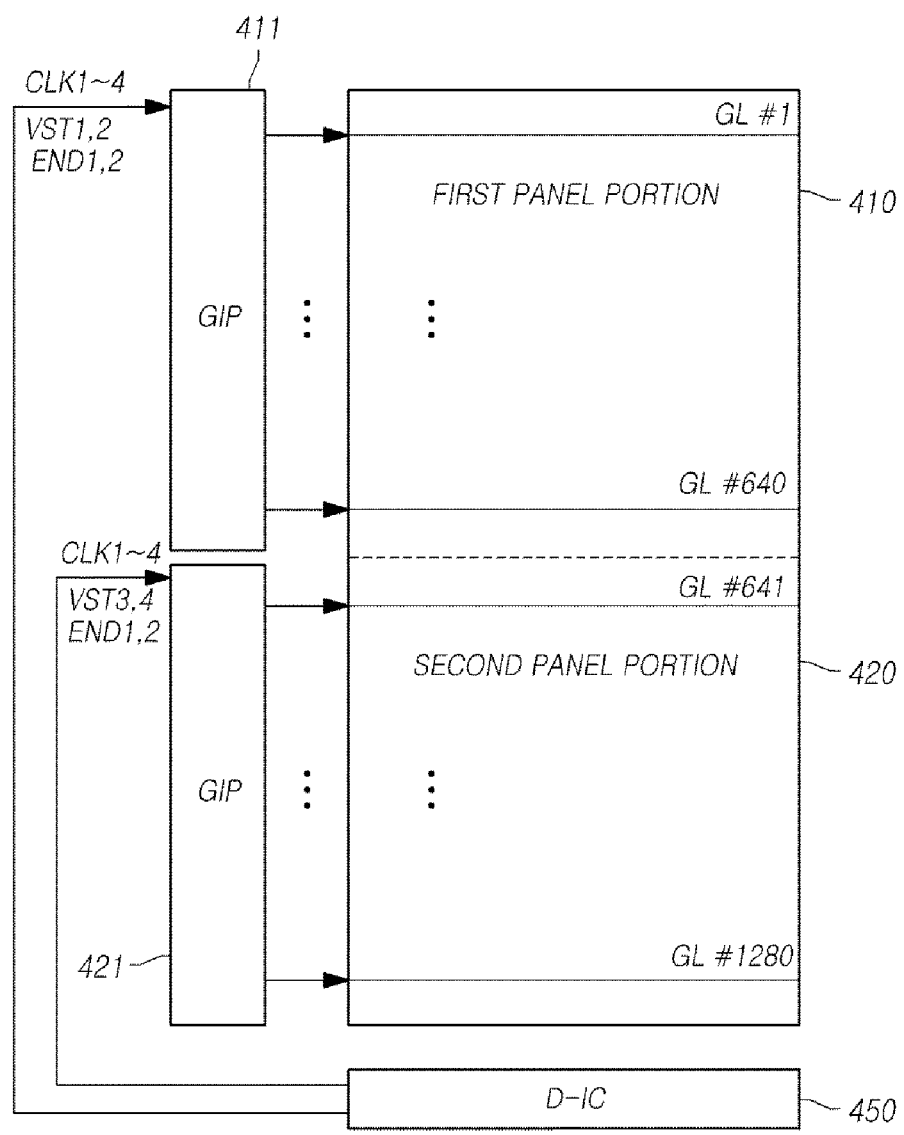
FIG. 6A-6C illustrate signals applied to a partial display panel according to the second embodiment.
Figure 6B:
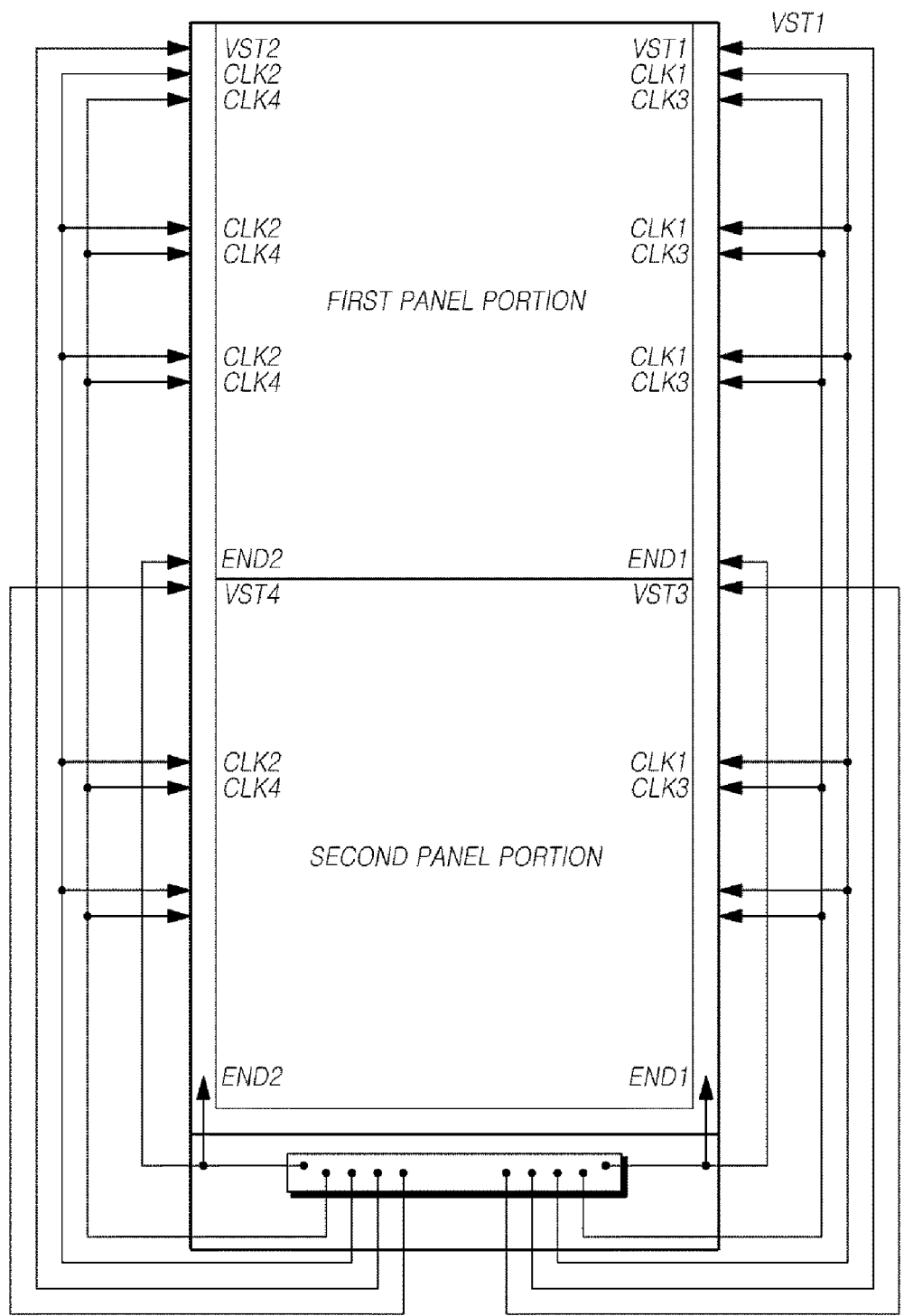
Figure 6C:
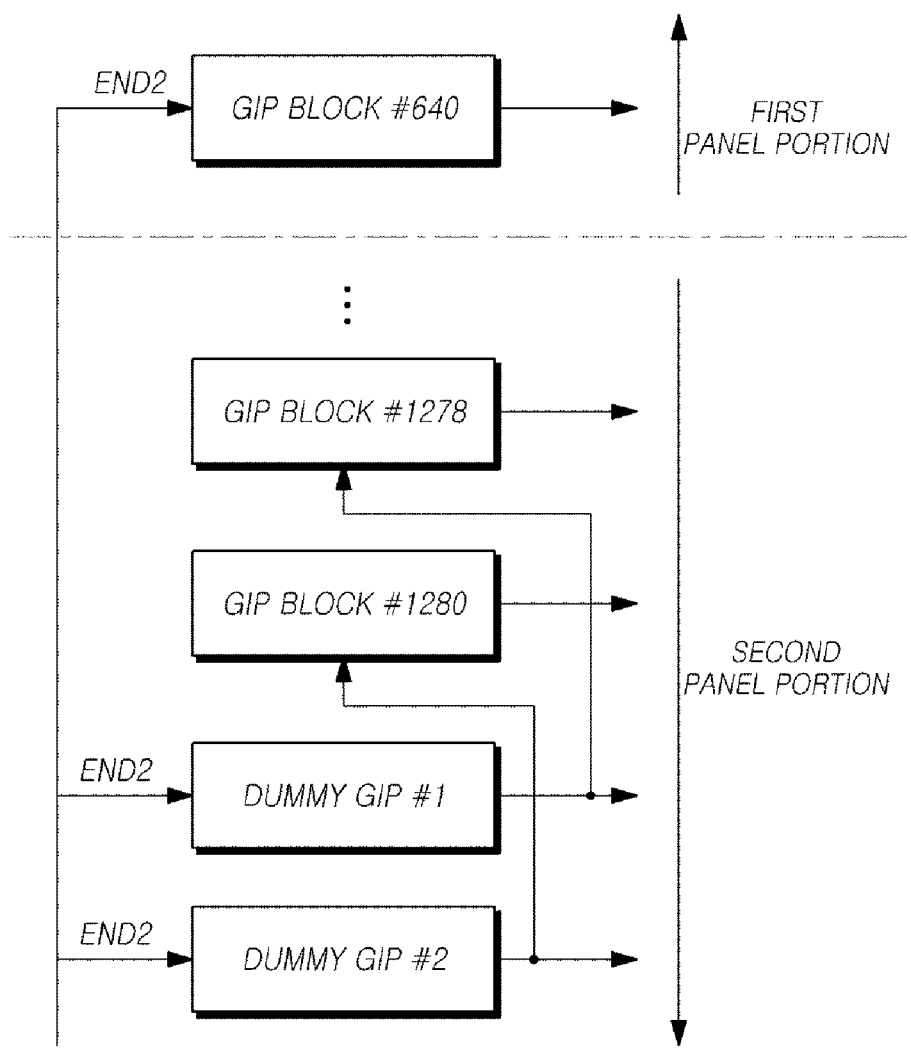

FIG. 6a-6c illustrate signals applied to a partial display panel according to the second embodiment. FIG. 6a is a schematic diagram of the signals applied to the panel portions. FIG. 6b illustrates signals applied to the display panel at both sides of the panel symmetrically. FIG. 6c illustrates the input scheme of the end signal according to the second embodiment.

Referring to FIG. 6a, for the first display mode of the first panel portion in the display device according to the second embodiment, the signals applied to the first gate driver 411 may be four clock signals CLK1 to CLK4 that are 2H 4 phase signals, a first start pulse VST1, a second start pulse VST2 and two end signals END1 and END2. For the second display mode of the second panel portion, the signals applied to the second gate driver 421 may be four clock signals CLK1 to CLK4 that are 2H 4 phase signals, a third start pulse VST3, a fourth start pulse VST4 and two end signals END1 and END2 equal to the end signals used in the first panel portion.

The display device according to the second embodiment is similar to that according to the first embodiment. A difference is that the first embodiment applies four end signals to the first panel portion, whereas the second embodiment applies only two end signals END1 and END2 to the first panel portion.

Hereafter, the driving method of the panel portions according to the second embodiment will be explained in reference with FIG. 6b.

The display device according to the second embodiment as shown in FIG. 6b may have a number of gate lines equal to 1280, namely N=1280. The first panel portion includes the first to 640th gate lines (#1 to #640) and the second panel portion 410 includes the 641th to 1280th gate lines (#641 to #1280) which are driven in pixel display modes sandwiching the first touch sensing mode interval. Each display panel may comprise an even gate driver (not shown) and an odd gate driver (not shown). The even gate driver receives the even signals. The odd gate driver receives odd signals. The even and odd gate drivers generate the output signals to be supplied to each of the gate lines, respectively. Two clocks, two start pulses are applied to each of the even and the odd gate drivers, respectively.

In contrast with the first embodiment in which two end signals are applied to each of the gate drivers, respectively only one end signal is input to each of the even and the odd gate drivers in the second embodiment.

The clocks CLK2 and CLK4, the second start pulse VST2 and the second end signal END2 may be input to one side, for example, the left side of the first panel portion. The clocks CLK1 and CLK3, the first start pulse VST1 and the first end signal END1 may be input to one side, for example, the right side of the first panel portion.

The clocks CLK2 and CLK4, the fourth start pulse VST4 and the second end signal END2 may be input to one side, for example, the left side of the second panel portion. Similarly, the clocks CLK1 and CLK3, the third start pulse VST3 and the first end signal END1 may be input to one side, for example, the right side of the second panel portion.

The scheme to input the end signal according to the second embodiment will be explained in reference with the FIG. 6c. One even end signal, namely the second end signal END2, is applied to the last gate circuit block (GIP block #640) among the even gate circuit blocks in the first panel portion. The same even end signal, namely the second end signal END2, is applied to one or more dummy gate circuit blocks (Dummy GIP block #1 and/or #2) included in the second panel portion.

Further, one odd end signal, namely the first end signal END1, is applied to the last gate driver in the same manner. In other words, the first end signal END1 is applied to the last odd gate circuit block (GIP block #639) in the first panel portion. The same odd end signal, namely the first end signal END1, is applied to one or more dummy gate circuit blocks (Dummy GIP block #1 and/or #2) included in the second panel portion.

The number of the end signals in the display device according to the second embodiment is reduced by one compared to that in the display device according to the first embodiment.

Further, the gate circuit block to which the end signal is input may receive stress due to the load by the end signal in itself. Only one end signal is input to the last even/odd gate circuit block of the first panel portion one time per one frame in the first embodiment, but the same end signal is input to that circuit block two times per frame in the second embodiment.

However, the signals according to the second embodiment have a pulse width of 2 H compared to the conventional pulse width of 4 H. Therefore although the same end signal is input two times, the stress of the gate circuit block by the end signal is equal to that of the previous gate circuit block so that the former is equal to the latter in view of the driving reliability.

On the other hand, the second embodiment can reduce the number of the end signals by one compared to the driving of the non-partial display panel (namely the driving type of the entire panel and the first embodiment), which is capable of reducing the width of signal line unit on both sides and forming a narrower bezel.

In contrast, the non-divided display panel using the conventional 4H 8 phase and the divided display panel according to the first embodiment are required to use in total six signal lines (for example, four clock lines, one VST line and one end signal for the non-divided panel, and two clock lines, two VST lines and two end signal lines for the panel portion according to the first embodiment) for each of both sides. In the divided display panel according to the second embodiment, the number of signal lines required can be reduced to five (i.e. two clock lines, two VST lines and one END signal line). Therefore the bezel size of the panel may be reduced.

As described above, the various present embodiments can divide the display panel into two or more panel portions and add a touch mode between the display modes of each panel portion, thereby improving a frequency of touch sensing or touch report rate.

Further, the various present embodiments can increase a frequency of touch sensing by using the partial display panels, reduce the pulse width of the signal from the 4 H 8 phase to 2H 4 phase by using oxide TFTs and maintain the number of the signal lines applied to the gate driver of the partial display panel, thereby advantageously preventing an increase of the bezel area.

Further, the various present embodiments can reduce the number of signal lines applied to the gate driver of the partial display panel by sharing the end signal of each partial display panel, thereby advantageously forming a narrower bezel.

While the technical spirit of the present invention has been exemplarily described with reference to the accompanying drawings, it will be understood by a person skilled in the art that the present invention may be varied and modified in various forms without departing from the scope of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A touch sensing display device comprising:
   a display panel having a common electrode and gate lines, the display panel including a first panel portion having a first subset of the gate lines and a second panel portion having a second subset of the gate lines; and
   gate drivers to drive the gate lines, the gate drivers comprising first gate driver circuitry to drive the first subset of the gate lines and second gate driver circuitry to drive the second subset of the gate lines,
   wherein during a single display frame period the display device operates in the following modes during distinct periods of time:
   a first display mode during which a common voltage is applied to the common electrode and the first gate driver circuitry drives the first subset of the gate lines, the first gate driver circuitry receiving one or more first start pulses and enabling the first gate driver circuitry based on the one or more first start pulses during the first display mode;
   a first touch sensing mode during which at least one first touch driving pulse is applied to the common electrode and touch is sensed across both the first panel portion and the second panel portion, the first touch sensing mode being after the first display mode;
   a second display mode during which the common voltage is applied to the common electrode and the second gate driver circuitry drives the second subset of the gate lines, the second gate driver circuitry receiving one or more second start pulses and enabling the second gate driver circuitry based on the one or more second start pulses during the second display mode, the second display mode being after the first touch sensing mode; and
   a second touch sensing mode during which at least one second touch driving pulse is applied to the common electrode and touch is sensed across both the first panel portion and the second panel portion, the second touch sensing mode being after the second display mode,
   wherein the first gate driver circuitry and the second gate driver circuitry both receive one or more same end signals and are disabled based on the one or more same end signals.

2. The display device of claim 1, wherein there are a total of N number of the gate lines in the display panel, the first subset of the gate lines includes 1st to N/2th of the gate lines and the second subset of the gate lines includes (N/2+1)th to Nth of the gate lines.

3. The display device of claim 1, wherein the gate drivers receive a total of four clock signals and drive the gate lines based on the four clock signals.

4. The display device of claim 3, wherein each clock signal has a pulse width of two horizontal line periods.

5. The display device of claim 1, wherein the one or more first start pulses comprise two first start pulses, and the one or more second start pulses comprise two second start pulses which are different from the two first start pulses.

6. The display device of claim 1, wherein the one or more same end signals comprises two same end signals.

7. The display device of claim 6, wherein the first gate driver circuitry further receives two additional end signals, and disables driving of the first subset of the gate lines based on the two same end signals and the two additional end signals.

8. The display device of claim 1, further comprising one or more signal lines to carry the one or more same end signals.

9. A method of operation in a touch sensing display device, the display device including a common electrode and a first panel portion having a first subset of gate lines and a second panel portion having a second subset of the gate lines, the method comprising:

during a first display mode of a display frame period, applying a common voltage to the common electrode and driving the first subset of the gate lines with first gate driver circuitry that receives one or more first start pulses and is enabled based on the one or more first start pulses;

during a first touch sensing mode of the display frame period, applying at least one first touch driving pulse to the common electrode and sensing touch across both the first panel portion and the second panel portion, the first touch sensing mode being after the first display mode;

during a second display mode of the display frame period, applying the common voltage to the common electrode and driving the second subset of the gate lines with second gate driver circuitry that receives one or more second start pulses and is enabled based on the one or more second start pulses, the second display mode being after the first touch sensing mode; and during a second touch sensing mode of the display frame period, applying at least one second touch driving pulse to the common electrode and sensing touch across both the first panel portion and the second panel portion, the second touch sensing mode being after the second display mode, wherein one or more same end signals are provided to both the first gate driver circuitry and the second gate driver circuitry, the one or more same end signals disabling both the first gate driver circuitry and the second gate driver circuitry.

10. The method of claim 9, wherein there are a total of N number of the gate lines in the display device, driving the first subset of the gate lines includes driving 1st to N/2th of the gate lines, and driving the second subset of the gate lines includes driving (N/2+1)th to Nth of the gate lines.

* * * * *